(12) United States Patent
Uetabira (10) Patent No.: US 10,304,250 B2
(45) Date of Patent: May 28, 2019

(54) DANGER AVOIDANCE SUPPORT PROGRAM

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 53 days.

(21) Appl. No.: 15/470,993

(22) Filed: Mar. 28, 2017

(65) Prior Publication Data

US 2017/0278307 A1 Sep. 28, 2017

(30) Foreign Application Priority Data

Mar. 28, 2016 (JP) .................................. 2016-063548

(51) Int. Cl.
*G06T 19/00* (2011.01)
*G06F 3/01* (2006.01)
*G01S 17/08* (2006.01)
*H04W 88/02* (2009.01)

(52) U.S. Cl.
CPC ............. *G06T 19/006* (2013.01); *G01S 17/08* (2013.01); *G06F 3/013* (2013.01); *H04W 88/02* (2013.01)

(58) Field of Classification Search
CPC ................................ G06T 19/006; G01S 17/08
See application file for complete search history.

(56) References Cited

U.S. PATENT DOCUMENTS

| 9,916,635 | B2 * | 3/2018 | Kim | H04N 5/265 |
| 2014/0063064 | A1 * | 3/2014 | Seo | G08G 1/166 |
| | | | | 345/633 |
| 2014/0104316 | A1 * | 4/2014 | Sharma | G06F 1/1626 |
| | | | | 345/633 |
| 2016/0261300 | A1 * | 9/2016 | Fei | H04W 4/70 |

FOREIGN PATENT DOCUMENTS

JP 2014-203395 A 10/2014

* cited by examiner

*Primary Examiner* — Samantha (Yuehan) Wang
(74) *Attorney, Agent, or Firm* — Maier & Maier, PLLC (57) ABSTRACT

A danger avoidance support program is described which make it possible to always grasp the surrounding situation and avoid danger such as collision even when using a smartphone while walking. This danger avoidance support program detects a direction to each of a plurality of measurement objects located ahead of the portable information terminal and measures the distance to the each measurement object to display the plurality of measurement objects in real time on the screen of the portable information terminal by mapping the plurality of measurement objects in the space of the screen of the portable information terminal on the basis of the detected directions and the measured distances. The plurality of measurement objects are displayed on the screen of the portable information terminal as translucent images which are superimposed on an image displayed by another application running on the portable information terminal.

4 Claims, 6 Drawing Sheets

DANGER AVOIDANCE SUPPORT PROGRAM

CROSS-REFERENCE TO RELATED APPLICATIONS

The present application claims priority under 35 U.S.C. § 119 to Japanese Patent Application No. P2016-063548, filed Mar. 28, 2016. The contents of this application are herein incorporated by reference in their entirety.

FIELD OF INVENTION

The present invention relates to a danger avoidance support program which is used by installing it in a portable information terminal.

DESCRIPTION OF RELATED ART

In recent years, it becomes a social problem to use and operate a smartphone, while walking, on a street, a staircase or the like where many people come and go. There also have occurred such a trouble that a user using a smartphone while walking encounters a pedestrian or a bicycle resulting in an injured. Such conduct is apparently discourteous. However, there is no end to the number of people who easily conduct such acts, for example, when in haste.

In such a situation, there have been proposed several solutions to resolve or lessen the "smartphone use while walking" problem. For example, Japanese Patent Published Application No. 2014-203395 discloses a technique to restrict the functions of a smartphone when it is determined by detecting a walking state with a sensor of the smartphone that the smartphone is used while walking.

Such restriction is, for example, to make a smartphone be in a standby state, or make a display be turned off when it is determined that the smartphone is used while walking. In this case, the user need not view a screen of the smartphone, and therefore can pay attention to the circumference. Alternatively, even in such a case, only the input operation may be disabled while the display continues displaying the screen. Little attention is paid during performing an input operation. Accordingly, in this case, while inhibiting input operations, viewing is permitted to secure certain convenience and avoid a danger.

However, there is little risk, for example, when a smartphone is temporarily used while walking in a place where few person is around. In such a case, the restriction of the functions of a smartphone simply damages convenience for a user. On the other hand, there may be persons who dislike the above restriction and do not add (or disable) the restriction function to a smartphone.

It is therefore an object of the present invention to provide a danger avoidance support program making it possible to always grasp the surrounding situation and avoid danger such as collision even when using a smartphone while walking.

SUMMARY OF THE INVENTION

To achieve at least one of the above-mentioned objects, reflecting one aspect of the present invention, a computer program product comprises a non-transitory computer readable medium including programmed instructions to be executed by a computer included in a portable information terminal provided with a distance measurement device capable of detecting a direction to a measurement object and measuring a distance to this measurement object, wherein the instructions, when executed by the computer, cause the computer to perform: a measurement step of detecting a direction to each of a plurality of measurement objects located ahead of the portable information terminal and measuring a distance to the each measurement object; and a display step of mapping the plurality of measurement objects in a space of a screen of the portable information terminal on the basis of the detected directions and the measured distances, and displaying the plurality of measurement objects in real time on the screen of the portable information terminal in accordance with the mapping, wherein the plurality of measurement objects are displayed on the screen of the portable information terminal as translucent images which are superimposed on an image displayed by another application running on the portable information terminal.

In accordance with a preferred embodiment, the instructions, when executed by the computer, further cause the computer to perform: a determination step of determining whether or not the portable information terminal is being used by a user while the user is walking, wherein the measurement step and the display step are performed when it is determined in the determination step that the portable information terminal is being used by the user while the user is walking.

Also, in accordance with a preferred embodiment, the plurality of measurement objects include at least one of a walker, a pillar, a wall, a staircase and a train platform edge.

Also, in accordance with a preferred embodiment, when the user is about to encounter at least one of a walker, a pillar, a wall, a staircase and a train platform edge, the portable information terminal outputs an alarm.

BRIEF DESCRIPTION OF THE DRAWINGS

The objects and features of the present invention will become more apparent from consideration of the following detailed description taken in conjunction with the accompanying drawings in which.

DETAILED DESCRIPTION OF THE PREFERRED EMBODIMENT

Figure 1:
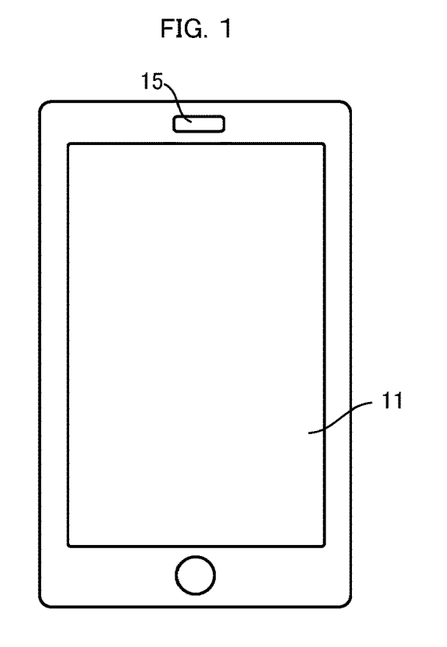
FIG. 1 is a front view for showing a smartphone in which is installed a danger avoidance support program in accordance with en embodiment of the present invention.
Figure 2:
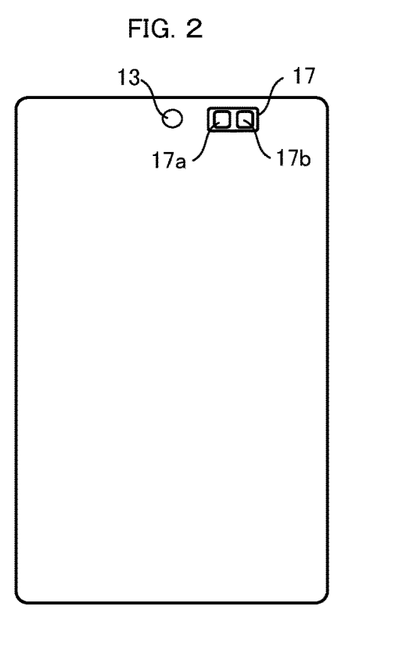
FIG. 2 is a back view for showing the smartphone in which is installed the danger avoidance support program in accordance with the embodiment of the present invention.

In what follows, a danger avoidance support program in accordance with an embodiment of the present invention will be explained with reference to the accompanying drawings. FIG. 1 and FIG. 2 are a front view and a back view for showing a smartphone (portable information terminal) 10 in which the danger avoidance support program is installed.

This smartphone 10 is provided with a screen 11 such as a liquid crystal display device, a RGB camera 13 capable of taking full color images, a speaker 15 and a distance measurement device 17. The screen 11 and the speaker 15 are located in the front side of the smartphone 10, and the RGB camera 13 and the distance measurement device 17 are located in the back side of the smartphone 10. Sensors incorporated in the smartphone 10 include a GPS system, an acceleration sensor, a gyro sensor (three-axis gyroscope), an azimuth sensor, an atmospheric pressure sensor, a temperature sensor, a proximity sensor, an illuminance sensor, an inclination sensor and so forth.

The distance measurement device 17 is a so-called laser range scanner or 3D scanner capable of detecting the direction to a measurement object and measuring the distance to this measurement object. In this example, the distance measurement device 17 measures a distance by an optical laser system with a LIDAR (Light Detection and Ranging) device on the basis of an optical phased array method. This LIDAR device includes a receiving unit 17*b* and a transmitting unit 17*a* consisting of a number of laser devices formed on a semiconductor chip and capable of performing beam forming.

Figure 3:
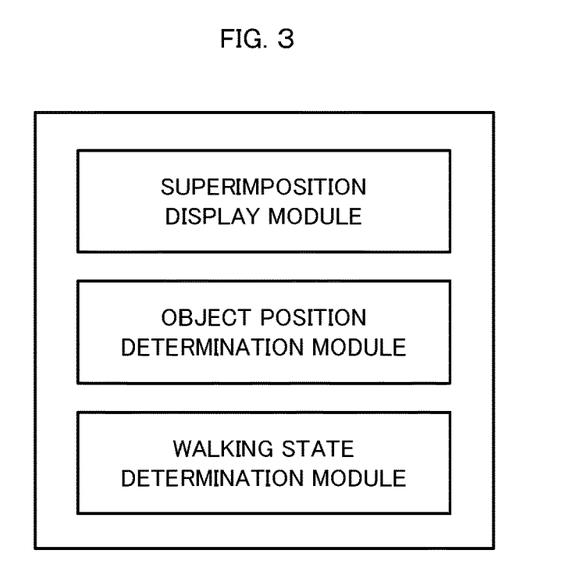
FIG. 3 is a schematic diagram for showing the configuration of the danger avoidance support program in accordance with the embodiment.

This smartphone incorporates a computer consisting of a processor and a memory in which the danger avoidance support program is installed. The danger avoidance support program consists of a walking state determination module, an object position determination module and a superimposition display module as illustrated in FIG. 3. The danger avoidance support program is resident in the memory to continuously run in the background.

The walking state determination module determines whether or not this smartphone is being used while walking. It is determined by a sensor of the smartphone whether or not the user is walking (walking state). In this case, the walking state is determined if random acceleration is continuously detected by an acceleration sensor. Using state of the smartphone can be determined by determining whether or not the screen is facing upward with an inclination sensor, and whether or not the screen is turned on. If the screen is facing upward and turned on, it is determined that the smartphone is being used.

Specifically, it is important whether or not the user is actually viewing the screen. By confirming the eyes of the user with an in-camera of the smartphone, it can accurately be determined whether or not the user is actually viewing the screen. Namely, by analyzing the image taken with the in-camera and confirming the eyes of the user are directed to the screen, it is determined that the user is actually viewing the screen.

If the smartphone is used while walking, the distance measurement device 17 performs measurement of an object(s) in front. The output of the distance measurement device 17 is in the form of three-dimensional stereoscopic information. This stereoscopic information is converted into a two-dimensional arrangement view by the object position determination module. In what follows, the operation of the object position determination module will be explained.

Figure 4:
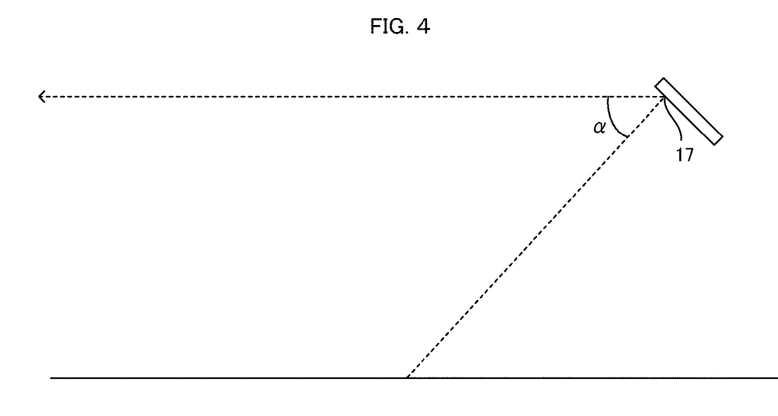
FIG. 4 is a view for explaining measurement of a front situation with a distance measurement device installed in the smartphone in accordance with the embodiment.

When used while walking, the smartphone is obliquely held to face forward in usual cases. As illustrated in FIG. 4, when the smartphone is inclined at an angle $\alpha$ from its upright position, measurement in the horizontal direction is possible if the view angle of the distance measurement device 17 is larger than twice this angle $\alpha$. If the view angle of the LIDAR device incorporated in the distance measurement device 17 is 120 degrees, measurement in the horizontal direction is possible as long as the inclination angle of the smartphone from its upright position is up to 60 degrees.

If measurement in the horizontal direction is possible, measurement data can be obtained to the distance. When the smartphone is further inclined near the horizontal direction so that no measurement data can be obtained in the horizontal direction, an indication is displayed to prompt the user to raise the smartphone. The horizontal direction can be detected by the inclination sensor of the smartphone, or with reference to the direction of the ground (floor plane). Two-dimensional data is constructed by projecting, on the plane in this horizontal direction, objects such as other walkers on the ground. In other words, an image as seen from above is created. The two-dimensional data may contain walkers, pillars, a boundary at a wall, a boundary at a staircase, an edge of a train platform (railroad side edge) and the like. Furthermore, the two-dimensional data may contain a vehicle or other obstacles.

Figure 5:
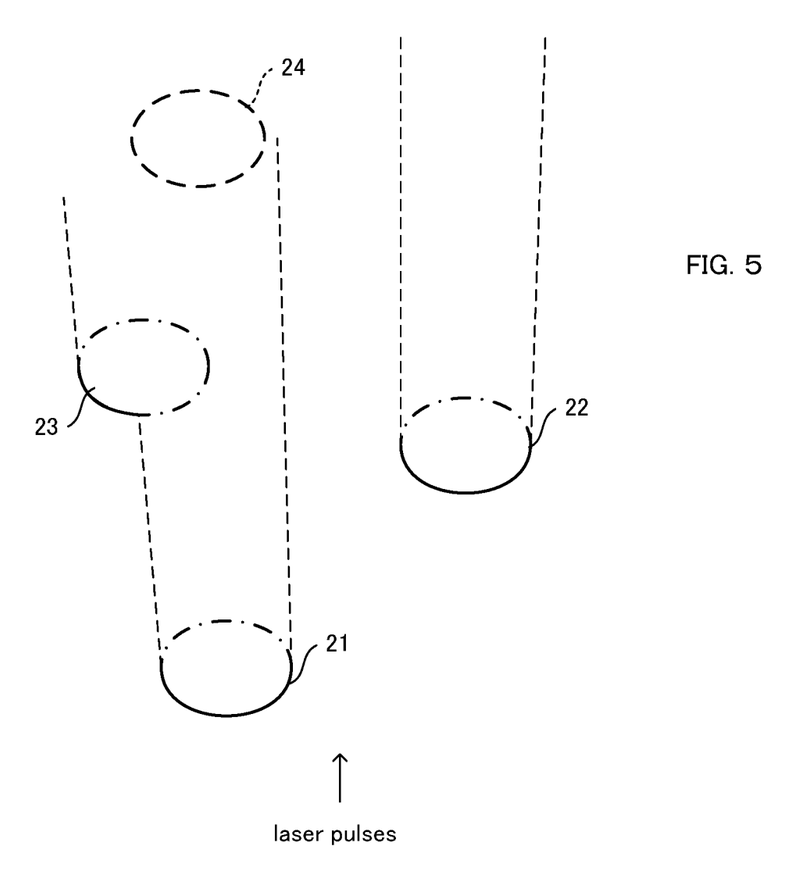
FIG. 5 shows an example of an image as seen from above corresponding to three-dimensional stereoscopic information measured by the distance measurement device in the case where there are four walkers in front.

FIG. 5 shows an example of an image as seen from above corresponding to three-dimensional stereoscopic information measured by the distance measurement device 17 in the case where there are four walkers in front. In this case, a walker is indicated by an oval. Since the distance measurement device 17 makes use of reflection of laser pulses, actually, only front side surfaces are measured so that dashed-dotted lines are used to indicate the surfaces which are not seen but estimated. For example, the walker 23 is half hidden by the walker 21. On the other hand, since the walker 24 is completely hidden by the walkers 21 and 23, the distance measurement device 17 cannot detect the walker 24. Accordingly, the distance measurement device 17 can identified three walkers, i.e., the walkers 21, 22 and 23.

Figure 6:
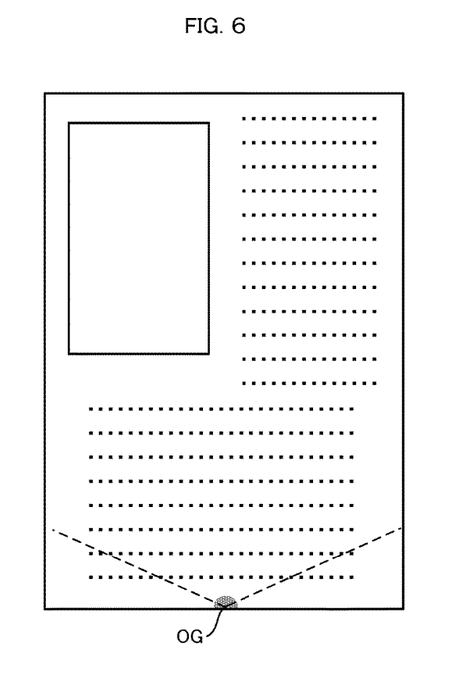
FIG. 6 is a schematic diagram for showing an example of the screen of the smartphone in which is run the danger avoidance support program in accordance with the embodiment.

The identified walkers are displayed by the superimposition display module on the screen of the smartphone as follows. As illustrated in FIG. 6, the screen of the smartphone is occupied by images and text of another application. The space of this screen also represents the front space of the smartphone with the position OG of the smartphone located in the center bottom of the screen. The vertical direction corresponds to the front-to-back direction of the real space, and the lateral direction corresponds to the left-to-right direction of the real space. Also, for example, the size of the screen in the vertical direction corresponds to 5 m in the front-to-back direction of the real space.

Meanwhile, the broken lines obliquely extending from the center bottom point OG define the measurable area of the distance measurement device 17 corresponding to the view angle thereof. Namely, the areas in front of the broken lines are unmeasurable areas.

Figure 7:
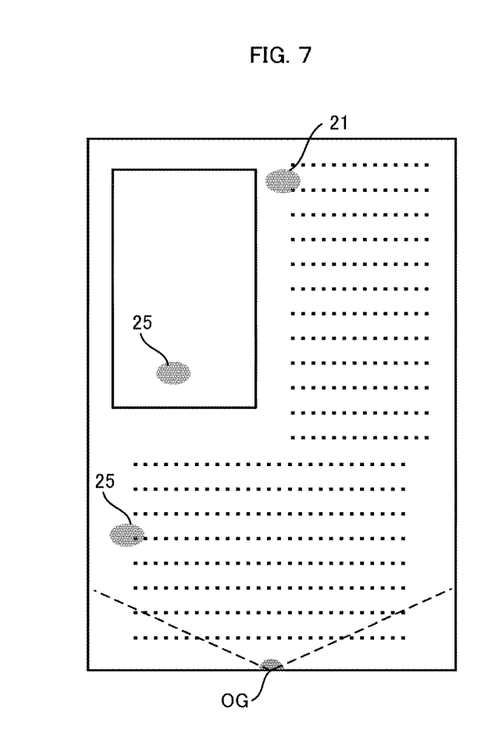
FIG. 7 is a schematic diagram for showing an example of the screen of the smartphone in which is displayed a situation that a walker approaches from the front.

When approaching beyond 5 m ahead, as illustrated in FIG. 7, the walker 21 is displayed near the upper edge of the screen. The displaying process is performed to translucentize objects (walkers in this case) so as to display also the image and text of an application which is currently running. There are displayed walkers 25 who are walking in the same direction as the user so that they move a little. While continuing the use of the application, the user notices the approach of the oncoming walker 21 on the screen and pays attention to this.

If the user stops walking in this case, i.e., if the walking state is no longer detected, the user is allowed to select a setting of continuing the superimposition of the front view or a setting of turning off the superimposition of the front view. Namely, even if stopping walking, the user can possess a sense of safety with the superimposing display showing the situation around the user. On the other hand, it may be convenient that the smartphone can be operated with more concentration by stopping walking and turning off the superimposition of the front view.

Figure 9:
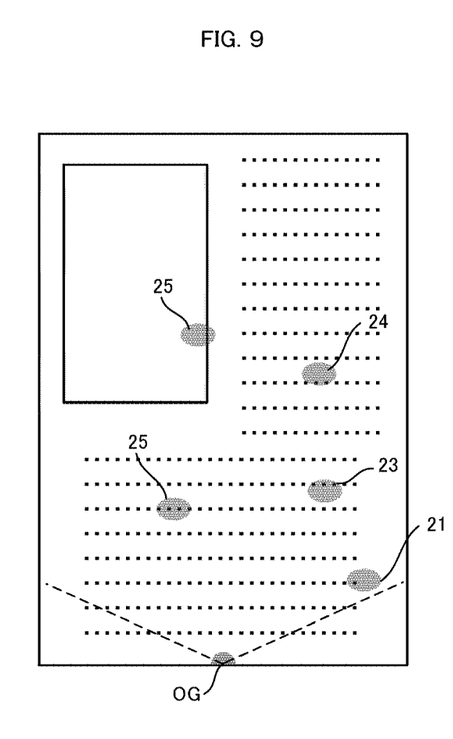
FIG. 9 is a schematic diagram for showing the example of the screen of the smartphone in which is displayed the situation that the walker approaches from the front.

Next, when the walkers 22 and 23 approach beyond 5 m ahead, following the walker 21, the user determines that it is appropriate to move left and avoid these walkers. The user then moves left and avoid these walkers as illustrated in FIG. 9. The oncoming walkers 21, 22 and 23 move to the front and the right on the screen. The use of the application is continued as it is. FIG. 9 is a view showing a field of vision of the distance measurement device 17 from which the right walker 22 exits while the rear walker 24 enter the field of vision instead.

When the user is about to encounter another walker, for example, when the user will encounter another walker if continuing walking for 10 seconds, it is preferred to warn the danger. Specifically, if it turns into this kind of situation, for example, the smartphone outputs warning sound as "You are about to encounter", or display "Danger! Avoid collision". Alternatively, the smartphone may display the front view on the upper half of the screen.

Figure 8:
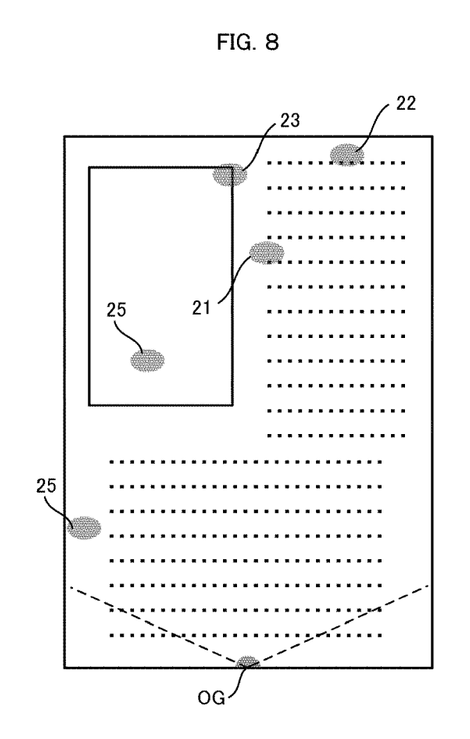
FIG. 8 is a schematic diagram for showing the example of the screen of the smartphone in which is displayed the situation that the walker approaches from the front.
Figure 10:
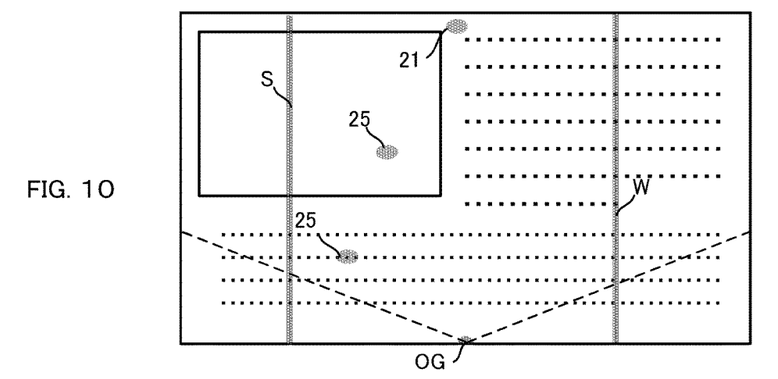
FIG. 10 is a schematic diagram for showing another example of the screen of the smartphone in which is displayed the situation that the walker approaches from the front.
Figure 11:
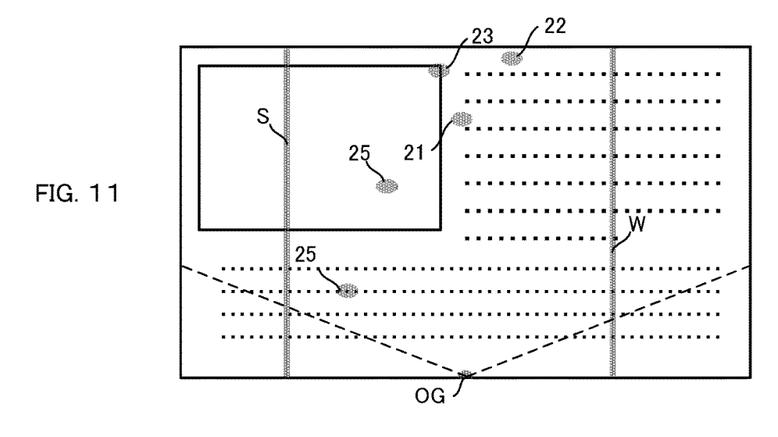
FIG. 11 is a schematic diagram for showing the another example of the screen of the smartphone in which is displayed the situation that the walker approaches from the front.
Figure 12:
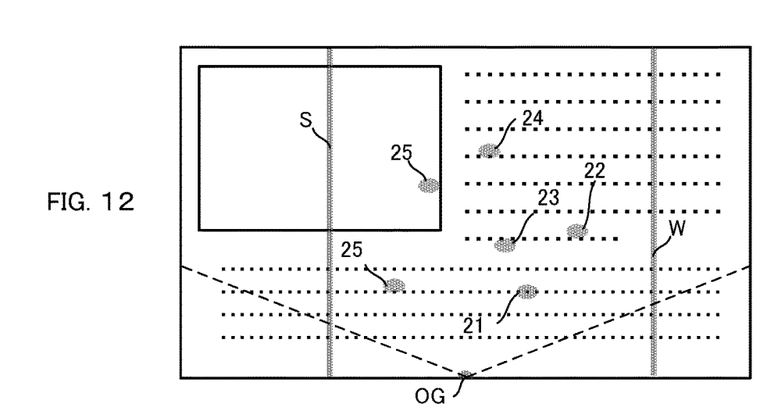
FIG. 12 is a schematic diagram for showing the another example of the screen of the smartphone in which is displayed the situation that the walker approaches from the front.

The similar images as explained above can be displayed also when the smartphone is used in the landscape display mode (horizontal display mode). FIG. 10, FIG. 11 and FIG. 12 are views showing the screen of the smartphone in the landscape display mode corresponding to FIG. 7, FIG. 8 and FIG. 9. The above description is true also in FIG. 10, FIG. 11 and FIG. 12. However, since the front area 5 m ahead of the smartphone is displayed also in this case, the whole image is displayed on a reduced scale. In addition to this, a wall W is displayed in the right side. Furthermore, on the assumption that this place is a train platform, a platform edge S (border of the platform in the railroad side) is displayed. In this case, measurement data in the downward direction of the distance measurement device 17 is used to detect the platform edge S.

Meanwhile, the wall W and the platform edge S are displayed downward beyond the measurable area of the distance measurement device 17 in the figures. This is because the user moves forward so that static images such as the wall W and the platform edge S are displayed to move backward.

Figure 13:
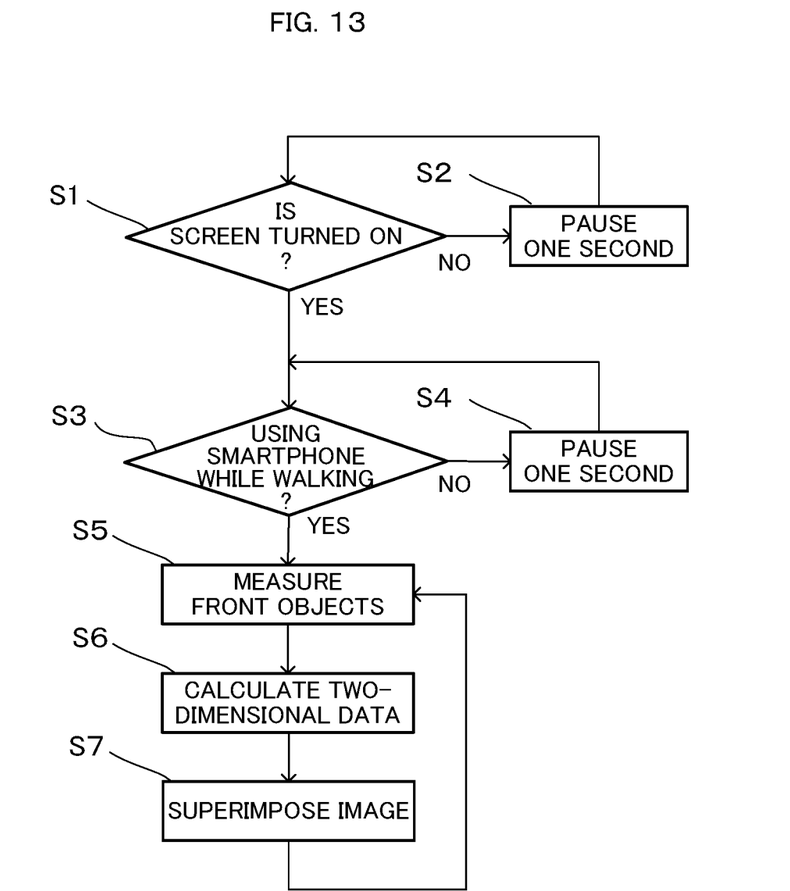
FIG. 13 is a flow chart for explaining the operation of the danger avoidance support program.

Next, the operation of this danger avoidance support program will be explained in detail with reference to the flow chart shown in FIG. 13. First, in step S1, it is determined whether or not the screen 11 of the smartphone is turned on. If the screen 11 of the smartphone is turned on, there is the possibility that the user is viewing the screen, and it is determined that the smartphone is being used.

Conversely, if the screen 11 of the smartphone is not turned on, the danger avoidance support program waits until the screen 11 is turned on. For this purpose, e.g., this determination step is repeated at fixed time intervals. Namely, after waiting for a predetermined time, e.g., one second in step S2, it is determined again whether or not the screen 11 is turned on in step S1.

If the screen 11 of the smartphone is turned on, it is determined whether or not the smartphone is being used while walking in step S3. It is determined by a sensor of the smartphone whether or not the user is walking (walking state). In this case, the walking state is determined if random acceleration is continuously detected by an acceleration sensor. Also, if the inclination sensor detects that the screen is facing downward, it is determined that the smartphone is not used.

If it is determined in step S3 that the smartphone is not used while walking, the danger avoidance support program waits until the smartphone is used while walking. For this purpose, e.g., this determination step is repeated at fixed time intervals. Namely, after waiting for a predetermined time, e.g., one second in step S4, it is determined again whether or not the user is walking in step S3.

If it is determined in step S3 that the user is walking, measurement of front objects is started in step S5 by operating the distance measurement device 17. The output of the distance measurement device 17 is in the form of three-dimensional stereoscopic information. Accordingly, in step S6, this stereoscopic information is converted into a two-dimensional data. Namely, two-dimensional data is constructed by projecting, on the plane in a horizontal direction, objects such as other walkers on the ground. At this time, the three-dimensional stereoscopic information is analized to obtain information about an edge of a train platform, a wall, a staircase, a step and so forth.

When the two-dimensional data including front objects such as walkers is obtained, this data is superimposed on the current screen image of the screen 11 of the smartphone. However, a walker is represented by a translucent green oval, and a border of a wall or the like is represented by a translucent green line. The background image (the view of the currently running application) can thereby be viewed through.

After displaying the superimposed image, the process is returned to step S5 again to measure front objects. The screen is successively updated by repeating step S5 through step S6 to display the situation around the user on a real time base. However, if the screen is turned off or inclined downward during repeating step S5 through step S6, an interrupt handler is invoked to return to step S1 and wait until the screen 11 is turned on.

The process of this example is returned to the measurement of front objects from the screen update step S7. In this case, even if the user stops walking and continues operation of the smartphone (i.e., even if the user is no longer walking), the situation around the user is superimposed and displayed on the screen. This may be convenient in a sense because the user can know the surrounding situation and possess a sense of safety. However, since it is not so danger such as collision when not walking, superimposition of the surrounding situation seems unnecessary. In order to superimpose the surrounding situation only when walking, the process may proceed from the screen update in step S7 to the determination of walking state in step S3 in place of step S5. This branch direction can be selected by the user as a setting of the program.

As has been discussed above, in accordance with the danger avoidance support program of the present invention, it is possible to always grasp the surrounding situation and avoid danger such as collision even when using a smartphone while walking. Namely, even if the user is concentrated on the screen of a smartphone, the surrounding situation is displayed on this screen to inhibit overlooking, and therefore it is possible to smoothly move while using another application.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

While the distance measurement device of the above example is based on a distance measurement method making use of an optical laser system, the present invention is not limited thereto. For example, an active stereo method can be used to measure a distance according to the principle of triangulation.

Also, in the case of the distance measurement device of the above example, the LIDAR device based on an optical phased array method is installed on the back side of the smartphone. However, a LIDAR which is mechanically movable may be installed on the side surface of the smartphone. In this case, the LIDAR is directed to the horizontal direction by rotation around a rotation axis. Alternatively, the LIDAR may be directed to the horizontal direction in accordance with the principle of a level gauge or a gyro.

Still further, in the case of the distance measurement device of the above example, the positions of walkers and the like are superimposed on the view of another application. However, a part (for example, an upper or lower third) of the screen may be used to display the front image. In this case, the front image may be an image of a usual camera, or an image based on profile information extracted from the information obtained by the LIDAR and projected on a plane.

Furthermore, while a smartphone is explained as a portable information terminal of the present invention in the case of the above embodiment, the present invention is not limited thereto. For example, while working at the construction work site, a tablet or a PC is often operated to view design information such as drawings or the like information. However, a worker has to pay attention in order not to interfere with a construction vehicle or the like. In such a case, by making use of the danger avoidance support program according to the present invention, the surrounding situation can be grasped while viewing the screen of a tablet or a PC so that the efficiency of work can be improved.

Therefore, in accordance with the danger avoidance support program of the present invention, it is possible to diminish the danger encountered when using the portable information terminal while walking, and avoid an accident and a trouble in advance.

What is claimed is:

1. A computer program product comprising a non-transitory computer readable medium including programmed instructions to be executed by a computer included in a smartphone provided with a distance measurement device capable of detecting a direction to a measurement object which is located ahead of the smartphone and measuring a distance to this measurement object, wherein the instructions, when executed by the computer, cause the computer to perform:
   a measurement step of detecting a direction to each of a plurality of measurement objects located in a front space of the smartphone and measuring a distance to the each measurement object; and
   a display step of mapping the plurality of measurement objects in a screen of the smartphone, which virtually represents the front space of the smartphone and also provides a display area in which another application running on the smartphone displays an image, on the basis of the detected directions and the measured distances, and displaying the plurality of measurement objects in real time on the screen of the smartphone in accordance with the mapping,
   wherein the plurality of measurement objects is displayed on the screen of the smartphone as images which are superimposed on the image displayed by the another application,
   wherein the superimposed images are displayed to be so translucent that a user of the smartphone can view the image displayed by the another application through the displayed superimposed images corresponding to and indicative of positions of the plurality of measurement objects located in the front space of the smartphone,
   wherein the another application is a non-AR-equipped application configured to display content other than a view of the front space of the smartphone, and
   wherein positions of the superimposed images displayed on the screen of the smartphone represent the positions of the plurality of measurement objects in the front space of the smartphone.

2. The computer program product of claim 1, wherein the instructions, when executed by the computer, further cause the computer to perform: a determination step of determining whether or not the smartphone is being used by a user while the user is walking, wherein the measurement step and the display step are performed when it is determined in the determination step that the smartphone is being used by the user while the user is walking.

3. The computer program product of claim 2, wherein when the user is about to encounter at least one of a walker, a pillar, a wall, a staircase, and a train platform edge, the smartphone outputs an alarm.

4. The computer program product of claim 1, wherein the plurality of measurement objects includes at least one of a walker, a pillar, a wall, a staircase, and a train platform edge.

* * * * *